United States Patent [19]
Ferguson et al.

[11] Patent Number: 6,026,096
[45] Date of Patent: *Feb. 15, 2000

[54] AUTOMATIC SPEED SENSING IN A TOKEN RING LOCAL AREA NETWORK

[75] Inventors: H. Earl Ferguson, Sunnyvale; Michael Noll, San Jose; Randy Ryals, Menlo Park, all of Calif.

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/680,568

[22] Filed: Jul. 12, 1996

Related U.S. Application Data

[60] Provisional application No. 60/001,132, Jul. 12, 1995.
[51] Int. Cl.[7] .................................................. H04J 3/00
[52] U.S. Cl. ............................................ 370/452; 370/465
[58] Field of Search ...................................... 370/449, 450, 370/451, 401, 402, 403, 404, 405, 406, 407, 408, 460, 462, 465, 254, 258, 908, 909, 911, 226, 223, 240, 241, 243, 245, 247, 252, 251, 358, 391, 452; 340/825.05

[56] References Cited

U.S. PATENT DOCUMENTS

| | | | |
|---|---|---|---|
| 5,301,303 | 4/1994 | Abraham et al. | 395/500 |
| 5,530,696 | 6/1996 | Boggs et al. | 370/468 |
| 5,625,621 | 4/1997 | Christenson et al. | 370/248 |

*Primary Examiner*—Dang Ton
*Attorney, Agent, or Firm*—Blakely, Sokoloff, Taylor & Zafman LLP

[57] ABSTRACT

A method and apparatus for a node being inserted into a token ring local area network to sense the data transmission speed of the token ring LAN and automatically setting the data transmission speed of the node to match the data transmission speed of the token ring LAN. The token ring LAN may operate at either 4 megabits per second or 16 megabits per second. The node recovers data transmitted on the token ring, and determines, based thereon, the speed of the data transmission and configures the speed at which the node transmits and receives data to/from the token ring network accordingly.

5 Claims, 2 Drawing Sheets

AUTOMATIC SPEED SENSING IN A TOKEN RING LOCAL AREA NETWORK

This patent application claims the benefit of U.S. Provisional Application No. 60/001,132, filed Jul. 12, 1995.

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of computer networking. Specifically, the present invention relates to a method and apparatus for sensing the data transmission speed of a token ring local area network (LAN) when inserting a network device into the token ring LAN, and automatically setting the data transmission speed of the network device accordingly.

2. Description of the Related Art

Token ring local area networks (LANs) are well-known in the art and are described in, for example, the IEEE standard 802.5. IEEE 802.5 token ring LANs adhere to the ISO/IEC 8802-5.2 token ring access method and physical layer specifications. Generally, token ring LANs provide for transmission of a token from node to node in a network. When a node, such as station or a concentrator, is in possession of the token, it may transmit messages, in the form of data packets, onto the communication media. A basic advantage of this networking scheme is that access to the communications media is deterministic and, therefore, collisions that normally occur when two devices transmit at the same time are avoided.

FIG. 1 illustrates a simple token ring LAN 100 having stations 110 and 120 connected thereto. Additionally, token ring LAN 100 has a concentrator 130 connected thereto. Concentrator 130 is further connected to token ring LAN 140, to which stations 150 and 160 are connected. Concentrator 130 provides for communication of a plurality of stations on token ring LAN 100 with a plurality of stations on token ring LAN 140. In other words, while concentrator 130 may source its own data packets on to token ring LANs 100 and 140, its primary purpose is to forward data packets sourced, i.e., transmitted by, a source station on one of token ring LANs 100 and 140 to a destination station on the other token ring LAN.

Token ring LANs generally provide for transmission of data at 4 megabits per second (Mb/s) or 16 Mb/s. In the prior art, when a station was inserted in to a token ring LAN, the data transmission speed of the token ring LAN had to be known and the station manually configured accordingly, so that it would send and receives data packets at the appropriate speed to/from the token ring LAN. Moreover, in the prior art, if the station was configured to send and receive data packets at an incorrect rate, not only would the station be unable to communicate with other stations on the token ring LAN, but the entire token ring LAN would be rendered inoperative.

Also in the prior art, when a concentrator or the like was inserted in to a token ring LAN, the data transmission speed of the token ring LAN to which the concentrator was being connected had to be known so that the port on the concentrator could be configured for the proper data transmission speed. Of course, the concentrator could be coupled to one or more additional token ring LAN via other ports. It was possible that another token ring LANs operated at a different data transmission speed. If fact, one reason for using a concentrator or the like in a token ring LAN environment was to provide for communication between stations connected to token ring LANs operating at different data transmission rates. Thus, each port on the concentrator had to be manually configured to match the speed of the token ring LAN coupled thereto. As was the case with a station, improperly setting the data transmission rate for a port on the concentrator resulted in breaking the token ring LAN so that none of the nodes attached to that token ring LAN could communicate.

Advances have been made in the prior art such that when a node is inserted in to a token ring LAN at the incorrect speed, only the node is unable to communicate with other nodes on the token ring LAN—other nodes, either stations or concentrators, are still able to communicate successfully, assuming they are configured properly, including their data transmission speed setting. Of course, if a port on a concentrator is set to the incorrect speed, it will be unable to forward data packets to or from the token ring LAN attached thereto.

As can be seen by the above discussion of the prior art, a network manager must know the data transmission speed of the token ring LAN to which he or she is coupling a node in order to ensure the node and the token ring LAN are able to operate properly. However, because the node and the token ring LAN can operate and either 4 Mb/s or 16 Mb/s, the installation of a node, including configuration of the appropriate data transmission speed, is susceptible to human error. Thus, what is needed is a method and apparatus for ensuring that a station or concentrator inserted in to a token ring LAN is automatically configured to operate at a data transmission speed that is compatible with the data transmission speed of the token ring LAN.

SUMMARY OF THE INVENTION

Disclosed is a method and apparatus for ensuring that a station or concentrator inserted in to a token ring LAN is automatically configured to operate at a data transmission speed that is compatible with the data transmission speed of the token ring LAN. A method is described for matching a data transmission speed of a node with the data transmission speed of a token ring LAN when inserting the node in the token ring LAN, comprising the steps of inserting the node in to the token ring LAN, recovering data transmitted on the token ring LAN, sensing the data transmission speed of the token ring LAN from the recovered data, and matching the data transmission speed of the node with the data transmission speed of the token ring LAN.

DETAILED DESCRIPTION OF THE PREFERRED EMBODIMENT

What is described herein is a method and apparatus for ensuring that a station or concentrator inserted in to a token ring LAN is automatically configured to operate at a data transmission speed that is compatible with the data transmission speed of the token ring LAN. The method and apparatus provides for a node being inserted into a token ring local area network to sense the data transmission speed of the token ring LAN and automatically set the data transmission speed of the node to match the data transmission speed of the token ring LAN—either 4 megabits per second or 16 megabits per second. The node determines, based on recovered data transmitted on the token ring, the data transmission speed of the token ring LAN and configures the speed at which the node transmits and receives data to/from the token ring LAN accordingly. In the following description, specific details are set forth in order to provide a thorough understanding of the present invention. It will be apparent, however, to one skilled in the art that the present invention may be practiced without these specific details. In other instances, well-known circuits, structures and techniques have not been shown in order avoid unnecessarily obscuring the present invention.

Figure 1:
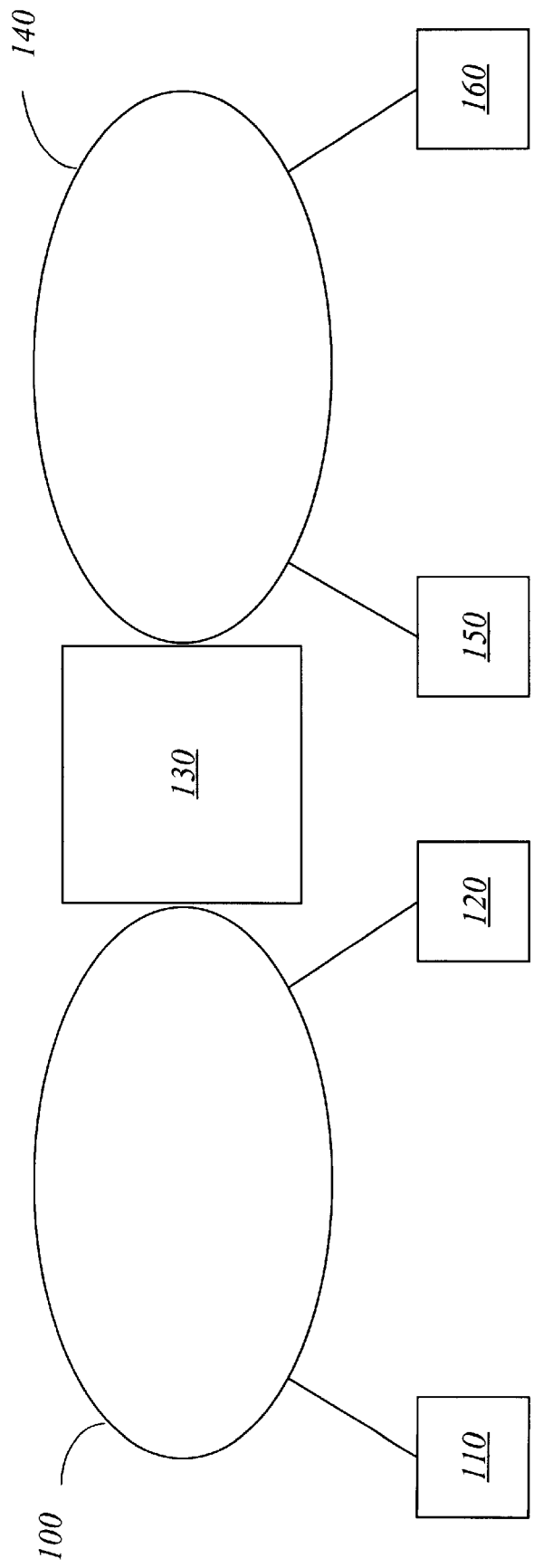
FIG. 1 is an illustration of a token ring network.
Figure 2:
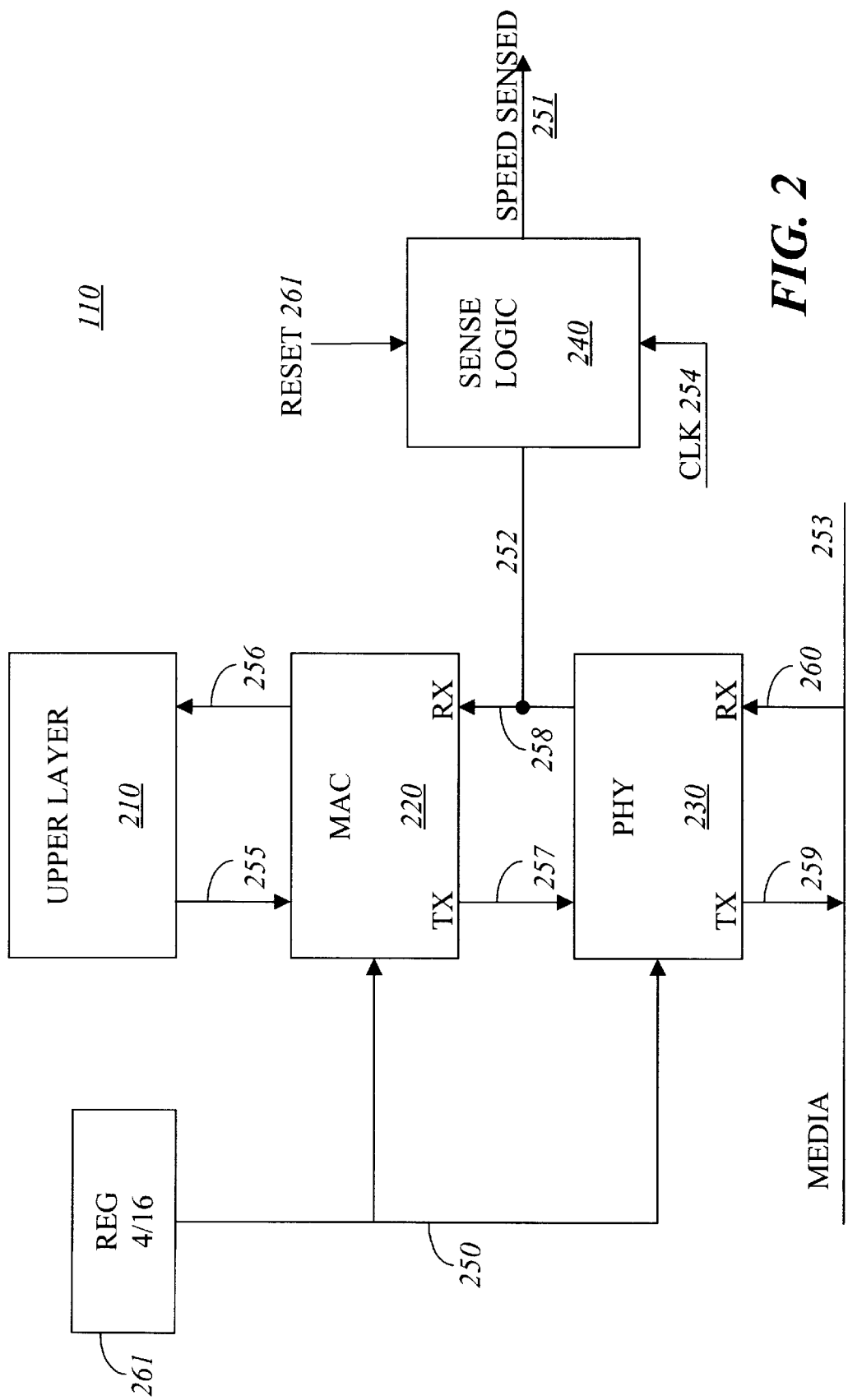
FIG. 2 is a block diagram of an apparatus for carrying out the method embodied by the present invention.

With reference to FIG. 2, a block diagram of a network interface for a station, e.g., station 110, is shown. The block diagram is equally applicable to the interface circuitry which may be found at the port of a concentrator or the like. The network interface is coupled to the communications media 253 via a transmit 259 and receive pair 260. Communications media may be comprised of, for example, unshielded twisted pair wiring commonly found in data and telecommunications networks. The transmit and receive pair is coupled to the communications media 253 via, for example, an RJ-45 connector, and to a physical layer block 230.

Physical block 230 transmits data received from the communications media 253 to the media access control (MAC) layer block 220 via line 258. Likewise, the physical block 230 receives data from MAC block 220 via line 257 and transmits the data out onto the communications media. The function and operation of the physical and MAC layers of a token ring network interface are well known to those of ordinary skill in the art and are described, for example, in the IEEE standard 802.5 and related documents. In a station, the MAC layer, in turn, may communicate with an upper layer protocol 210. The upper layer protocol transmits and receives data with the MAC layer via lines 255 and 256. Eventually, data received from the communications media may be passed up to an application layer protocol according to a layered model as shown FIG. 2. In the case of a concentrator or the like, generally, only the first two layers, i.e., the physical layer and the MAC layers are used in the receiving and forwarding of data packets between ports. Hence, such devices are often referred to as MAC layer bridging devices, and may operate according to well known source route, transparent, or source route transparent rules for forwarding data packets between token ring LANs.

With further reference to FIG. 2, the present invention provides for sense logic 240. Sense logic 240 is coupled to line 258 via recovered data line 252. In the present invention, when a station is inserted into a token ring LAN and powered up, data transmitted on the token ring LAN is received on line 258 from the communications media 253 via physical block 230. The data is further received by sense logic 240 via recovered data line 252. Sense logic 240 determines, based on the frequency of transitions in the data signal representing the recovered data and the clock signal 254 provided as input to the sense logic, the speed at which the token ring LAN is transmitting data. For example, if sense logic detects transitions in the data signal between, for example, 6 MHz and 16 MHz, the data transmission speed is considered to be 16 Mb/s. If, on the other hand, the sense logic detects transitions in the data signal between, for example, 1.5 MHz and 4 MHz, the data transmission speed of the token ring LAN is considered to be 4 Mb/s.

In one embodiment, sense logic 240 is, or comprises a portion of, a programmable logic array or programmable logic device. Alternatively, sense logic may also be comprised of a number of flip flops or latches for sampling the recovered data and specifying a logic value indicating the data transmission rate detected from the recovered data.

The signal transmitted on speed sensed line 251 indicates to the network interface the speed at which data is transmitted on the token ring LAN. A software module controlling the network interface receives the indication and automatically selects the appropriate data transmission speed at which the network interface in node 110 transmits and receives data from the communications media 253. The selection is communicated to the MAC and physical blocks via a 4/16 select line 250. If the sense logic detects 4 Mb/s for the data transmission speed on the token ring LAN, it transmits a low signal on speed sensed line 251. The software module, upon detecting the low signal on speed sensed line 251, causes the network interface to transmit a low signal on the 4/16 select line 250, indicating a data transmission speed of 4 Mb/s to the MAC and physical blocks. Thereafter, any data received at and transmitted by the MAC and physical blocks is done so at a transmission rate of 4 Mb/s.

Likewise, if sense logic detects 16 Mb/s for the data transmission speed on the token ring LAN, it transmits a high signal on speed sensed line 251. The software module, upon detecting the high signal on the line, causes the network interface to transmit a high signal on the 4/16 select line 250, indicating a data transmission speed of 16 Mb/s to the MAC and physical layer blocks. Data transmitted and received thereafter by the network interface is transmitted at 16 Mb/s.

In one embodiment, the software controlling the network interface resets sense logic 240 via reset line 261 after sense logic indicates the data transmission speed of the attached token ring LAN. In fact, to ensure the sense logic detects the speed from recovered data rather than, for example, noise on line 252, the software can reset sense logic a multiple number of times and will only cause the network interface to transmit a signal on the 4/16 select line 250 after sense logic repeatedly continues to indicate after some number of resets a signal indicating the speed of the token ring LAN. In this way, the speed of the token ring LAN can be accurately sensed and the network interface automatically configured to match the speed of the token ring LAN.

In one embodiment, a register 261 maintains a value indicating the transmission speed selected by the network interface. The register is coupled to the 4/16 select line 250. When sense logic 240 detects the speed of the data transmission, software controlling the network interface stores a value indicating the data transmission rate in the register. The network interface provides the contents of the register to the MAC and physical blocks via select line 4/16. In another embodiment, register 261 is a programmable register such that a network manager can manually set the data transmission speed to either 4 or 16 Mb/s, rather than allowing sense logic 240 to determine the data transmission speed.

There are, of course, alternatives to the described embodiment which are within the reach of one of ordinary skill in the relevant art. The present invention is intended to be limited only by the claims presented below.

Thus, what has been disclosed is a method and apparatus matching a data transmission speed of a node with the data transmission speed of a token ring local area network (LAN) when inserting the node in the token ring LAN.

What is claimed is:

1. A method for matching a data transmission speed of a node with a data transmission speed of a token ring local area network (LAN) when inserting the node in the token ring LAN, comprising the steps of:

a) inserting the node in to the token ring LAN;

b) recovering at the node data transmitted on the token ring LAN;

c) sensing at the node the data transmission speed of the token ring LAN from the data recovered in step b; and d) matching at the node the data transmission speed of the node with the data transmission speed of the token ring LAN.

2. The method of claim 1, wherein the node is a station.

3. The method of claim 1, wherein the node is a concentrator.

4. The method of claim 1, wherein the step of sensing at the node the data transmission speed of the token ring LAN includes sensing at the node whether the data transmission speed is approximately four megabits per second or approximately 16 megabits per second.

5. The method of claim 4, wherein the step of matching at the node the data transmission speed of the node with the data transmission speed of the token ring LAN includes the step of setting at the node the data transmission speed of the node to four megabits per second or 16 megabits per second depending on the data transmission speed sensed in step c.

* * * * *